(12) United States Patent
Smith et al.

(10) Patent No.: US 7,548,621 B1
(45) Date of Patent: Jun. 16, 2009

(54) SYSTEM AND METHOD FOR SECURING A BASE DERIVATION KEY FOR USE IN INJECTION OF DERIVED UNIQUE KEY PER TRANSACTION DEVICES

(75) Inventors: Walt E. Smith, Gaithersburg, MD (US); Larry F. Fisher, Jr., Jefferson, MD (US); Bavan Vargese, Fairfax, VA (US)

(73) Assignee: NCR Corporation, Dayton, OH (US)

( * ) Notice: Subject to any disclaimer, the term of this patent is extended or adjusted under 35 U.S.C. 154(b) by 592 days.

(21) Appl. No.: 10/256,869

(22) Filed: Sep. 26, 2002

(51) Int. Cl.
*H04L 9/00* (2006.01)
(52) U.S. Cl. .................................. 380/277; 713/194
(58) Field of Classification Search .................. 713/1, 713/2, 188, 194, 170, 181; 380/200, 201–203, 380/255, 277–279, 228, 239, 241, 281–286; 726/1, 2
See application file for complete search history.

(56) References Cited

U.S. PATENT DOCUMENTS

| | | | |
|---|---|---|---|
| 5,991,399 A | 11/1999 | Graunke et al. | |
| 5,999,629 A | 12/1999 | Heer et al. | |
| 6,009,177 A | 12/1999 | Sudia | |
| 6,226,618 B1 * | 5/2001 | Downs et al. | ................... 705/1 |
| 6,307,936 B1 | 10/2001 | Ober et al. | |
| 6,385,723 B1 | 5/2002 | Richards | |
| 6,411,716 B1 | 6/2002 | Brickell | |
| 6,421,768 B1 | 7/2002 | Purpura | |
| 6,549,626 B1 * | 4/2003 | Al-Salqan | ................... 380/286 |
| 2002/0136410 A1 * | 9/2002 | Hanna | ................... 360/277 |
| 2004/0022390 A1 * | 2/2004 | McDonald et al. | .......... 380/277 |

* cited by examiner

*Primary Examiner*—Kimyen Vu
*Assistant Examiner*—Joseph Pan
(74) *Attorney, Agent, or Firm*—Maginot, Moore & Beck LLP; Harden E. Stevens, III

(57) ABSTRACT

A system that secures a Base Derivation Key (BDK) in a facility for injecting Derived Unique Key Per Transaction (DUKPT) devices uses software for securing the BDK rather than a Tamper Resistant Security Module (TRSM). The system comprises a symmetrical key generator, a symmetric encryption device, a concatenating device, an asymmetrical key pair generator, and an asymmetrical encryption device. The symmetrical key generator randomly generates an encryption key for a symmetrical encryption method. The symmetrical key is provided to the symmetric encryption device for encrypting a segment of a BDK with a symmetrical key. The asymmetrical encryption device uses the public key of a randomly generated private/public key pair generated by the asymmetrical key pair generator to asymmetrically encrypt the symmetrically encrypted BDK segment and the symmetrical key. The public key is then destroyed and the private key is stored on the computer.

20 Claims, 4 Drawing Sheets

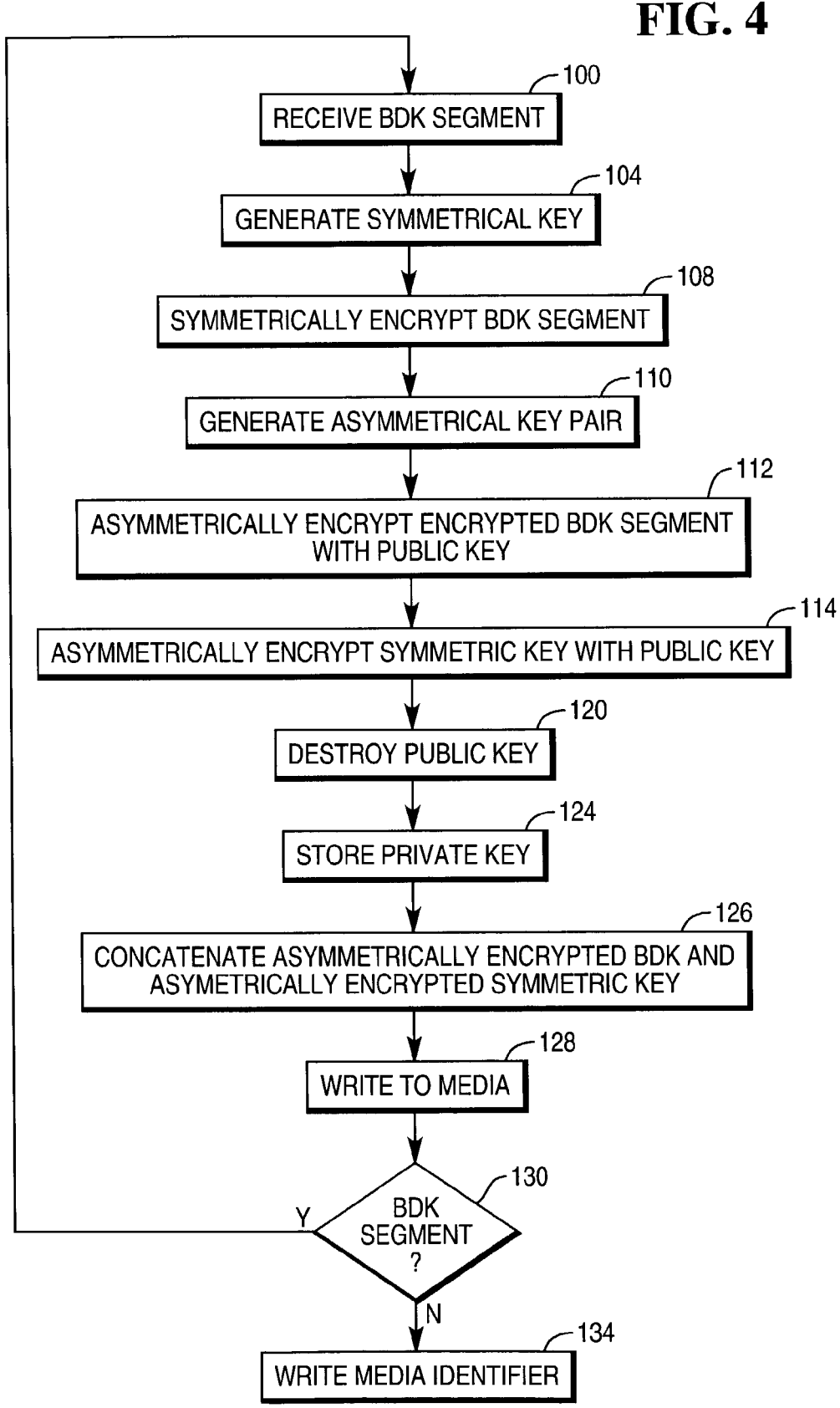

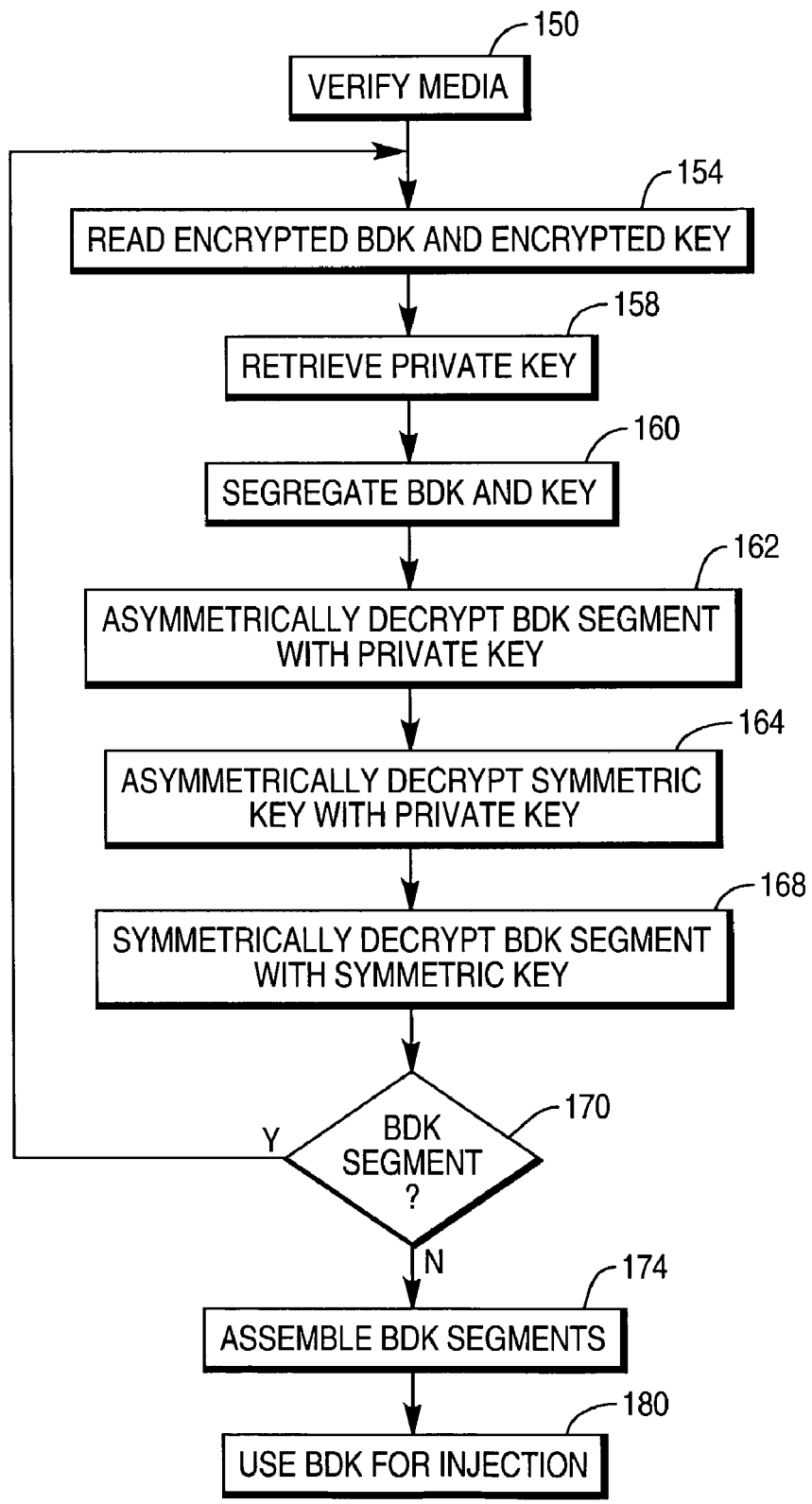

SYSTEM AND METHOD FOR SECURING A BASE DERIVATION KEY FOR USE IN INJECTION OF DERIVED UNIQUE KEY PER TRANSACTION DEVICES

FIELD OF THE INVENTION

This invention relates generally to devices for encrypting data using a Derived Unique Key Per Transaction (DUKPT) scheme and, more particularly, to the secure storage of a Base Derivation Key (BDK) at a facility for injection of a DUKPT encryption device.

BACKGROUND OF THE INVENTION

DUKPT encryption methods were developed to improve the security of financial account access data transmitted between a transaction site and a financial account authorization site. They are typically used in devices where a personal identification number (PIN) or other account access data are transmitted from one location to another to obtain access to a financial account. For example, PIN pads at checkout stations permit a user to enter a PIN through a 10 key pad and that number is encrypted along with account data read from a magnetic stripe of a debit card. The encrypted financial account data and PIN are used to query the database of a financial institution to obtain authorization to charge a consumer's financial account for a pending transaction amount.

The encryption of the PIN and financial account data is performed by the key pad device or other payment terminal using a Derived Unique Key Per Transaction (DUKPT) method as defined by ANSI $X_{9.24}$. To encrypt a PIN using this method, a DUKPT injection system must have a Base Derivation Key (BDK) and a Key Serial Number (KSN). The KSN is a unique value and is different for each payment terminal injected. The BDK is a 128 bit key that is used to encrypt the KSN, the result of which is combined with the KSN and injected into the payment terminal at the time of its manufacture. The terminal is constructed so that an attempt to compromise the security of the payment terminal causes the memory where the DUKPT encryption keys are stored to destruct. In this manner, unauthorized access to DUKPT encryption keys through dismantling of a payment terminal, PIN pad, or the like is denied.

During manufacture of the payment terminal or PIN pad, the BDK is used to encrypt data that is injected by a DUKPT injection system into the memory of the DUKPT encrypting unit. A bank or other financial institution clearinghouse generates the BDKs for DUKPT encryption unit manufacturers or injection facilities. A BDK is typically separated into three segments for a 128 bit key. The key segments are separated and sent to key custodians located at a facility certified for DUKPT key injection. To assemble the key for insertion into encryption units, each custodian takes the segment of the key that he or she received and enters a secured access room in which a computer, such as a personal computer, and a Tamper Resistant Security Module (TRSM) are located. Each custodian enters the room, one at a time, to enter the digits of the BDK segment provided to the custodian. The computer does not display the segments of the BDK so none of the custodians is able to view the BDK in its entirety. A checksum may be provided with the BDK segments to verify entry of the segments. This process is described in Appendix C of ANSI $X_{9.24}$-1998. After the BDK segments have been correctly entered into the computer, the computer assembles the BDK and stores it in the TRSM. The computer may then destroy the BDK so that the only remaining copy at the certified facility is within the TRSM. Thereafter, the TRSM uses the BDK to encrypt a unique KSN to generate an Initial PIN Pad Key (IPPK). The IPPK and KSN are injected into the memory of DUKPT encryption devices before they are sealed at the certified facility and shipped for incorporation into a checkout station, automated teller machine, or the like.

TRSM machines are expensive and only provide a single function, namely, the storage and injection of a BDK. Their design and operational data remains proprietary with the TRSM vendor so only the vendor is able to perform maintenance on a TRSM. Furthermore, the TRSM devices must be securely stored during periods when the manufacturing line is not operating or the injection of PINs are not required and the secure storage facility must house the entire machine.

What is needed is a way of securing BDKs for use in generating keys for injection in DUKPT units without requiring the expense and maintenance of TRSM units.

What is needed is a way of reducing the amount of equipment required for storing BDKs so they may be used to inject keys into a DUKPT encryption unit.

SUMMARY OF THE INVENTION

The above-noted limitations of previously known DUKPT injection systems have been overcome by a system and method that operate in accordance with the principles of the present invention. The system of the present invention comprises a symmetrical encryption device, an asymmetrical key pair generator, an asymmetrical encryption device, and a local memory for storing a private key. The symmetrical encryption device uses a symmetrical key for encrypting a segment of a BDK. The asymmetrical key pair generator generates a private/public key pair. The asymmetrical encryption device uses the public key of the randomly generated private/public key pair to encrypt the symmetrically encrypted BDK segment and its symmetrical key. The public key is destroyed and the private key is stored on a computer. The asymmetrically encrypted data are stored on a diskette or other removable memory media. The media may then be used to store all of the encoded segments for a BDK or each encoded segment of a BDK may be stored on separate removable memory media devices. The memory media devices may then be stored in a safe or other secured access device until the BDK is needed for generating keys for injection into a DUKPT encryption device. In this manner, split knowledge and dual control are achieved for the BDK as required by ANSI $X_{9.24}$ because the computer has the private key necessary for decrypting but the encrypted data are kept separately from the computer.

The system may also include a symmetrical key generator for randomly generating a symmetrical encryption key for the symmetrical encryption method performed by the symmetrical encryption device. Preferably, the symmetrical key generator produces a symmetrical key for each BDK segment.

Preferably, the symmetrical encryption method is the triple Data Encryption Standard (DES) or so-called triple DES method, which includes an encrypting, decrypting, encrypting cycle of the DES algorithm, although other symmetrical encryption methods may be used. The asymmetrical encryption method may be any known asymmetrical method that uses a public/private key scheme for data encryption/decryption. Such an asymmetrical encryption method enables the computer to store the private key for decrypting the asymmetrically encrypted BDK segment and symmetrical key data and the destruction of the public key prevents the generation of any other encrypted data for decryption with the private key. Destruction of the public key also prevents attempts to derive the private key from the public key and the encrypted data. Additionally, inclusion of a media identifier on the BDK storage unit allows the computer to interrogate the removable media so it does not commence a decryption operation unless the media is identified as one that the computer has previously written.

When the BDK is required for use in DUKPT device injection, the memory media device is released from the secured access storage unit and brought to the computer. The system components of the computer for securely regenerating the BDK from the data stored on media include an asymmetrical decryption device, a symmetrical decryption device and a BDK assembler. The asymmetrical decryption device uses the private key stored on the computer to decrypt the asymmetrically encrypted BDK segment and the asymmetrically encrypted symmetrical key. The symmetrical decryption device uses the symmetrical key to decrypt the symmetrically encrypted BDK segment. If the remaining encrypted segments of the BDK are stored on the same removable media, they may be read and decoded in the same manner and the BDK assembled from the decrypted segments. Otherwise, other removable media devices on which the other BDK encrypted segments are stored are brought to the computer so they may be read and the remaining BDK segments decrypted for assembly into the BDK. The assembled BDK may then be used to inject DUKPT encryption devices from the computer. The removable memory media may then be removed and returned to the secure storage unit at the manufacturing facility. When a manufacturing period is concluded, the BDK is deleted from the memory of the computer so that the removable media storing the encrypted BDK is required for assembly of the BDK for the next injection period.

The asymmetrical decryption device and symmetrical decryption device perform the decryption methods that correspond to the asymmetrical and symmetrical encryption methods used to encrypt the BDK segments and the symmetrical key. Preferably, these are the triple DES decryption or DES decryption methods although other symmetrical decryption methods may be used. The system of the present invention may also include a device for segregating the result of the asymmetrical decryption into a symmetrically encrypted BDK and its symmetrical key.

The method of the present invention includes encrypting a BDK segment using a symmetrical key, generating an asymmetrical key pair, encrypting the symmetrically encrypted BDK segment and the symmetrical key using a public key of the asymmetrical key pair, destroying the public key, and storing the private key in a local storage device. The method also includes randomly generating the symmetrical key and, preferably, a symmetrical key is generated for each BDK segment. The writing of the encrypted BDK segment and its encrypted symmetrical key to the removable media may also include the storing of a media identifier on the media. Also, prior to writing the encrypted BDK segment and its encrypted symmetrical key to the removable media, the encrypted BDK segment and its encrypted symmetrical key may be concatenated. The computer may use the media identifier to determine whether data stored on media should be read and decrypted. The method is repeated for each segment of the BDK so each segment is encrypted and stored on the removable media. Alternatively, each segment may be stored on separate media devices to provide additional controls over the BDK assembly.

The method of regenerating a BDK for use in the injection of a DUKPT encryption device is comprised of asymmetrically decrypting with a private key an asymmetrically encrypted BDK segment that has been symmetrically encrypted and asymmetrically decrypting with the private key an asymmetrically encrypted symmetrical key, symmetrically decrypting the symmetrically encrypted BDK segment using the symmetrical key obtained from the asymmetrical decryption, and assembling a plurality of decrypted BDK segments to form a BDK. An injection system may use the assembled BDK to generate an IPPK for injection into a DUKPT encryption device. The asymmetrically encrypted BDK segment with asymmetrically encrypted symmetrical key may be received from a removable media on which the encrypted BDK segment and encrypted symmetrical key have been stored.

It is an object of the present invention to securely store a BDK at a facility for injection of DUKPT encryption devices without requiring TRSM units.

It is an object of the present invention to securely store a BDK through software methods without requiring a specially constructed hardware device.

These and other advantages and features of the present invention may be discerned from reviewing the accompanying drawings and the detailed description of the invention.

BRIEF DESCRIPTION OF THE DRAWINGS

The present invention may take form in various system and method components and arrangement of system and method components. The drawings are only for purposes of illustrating exemplary embodiments and are not to be construed as limiting the invention.

FIG. 4 is a flow chart of an exemplary method that may be implemented at the certified facility of FIG. 1 to securely store a BDK; and FIG. 5 is a flow chart of an exemplary method that may be implemented at the certified facility of FIG. 1 to regenerate a BDK from stored segments for use in injecting DUKPT encryption devices.

DETAILED DESCRIPTION OF THE INVENTION

Figure 1:
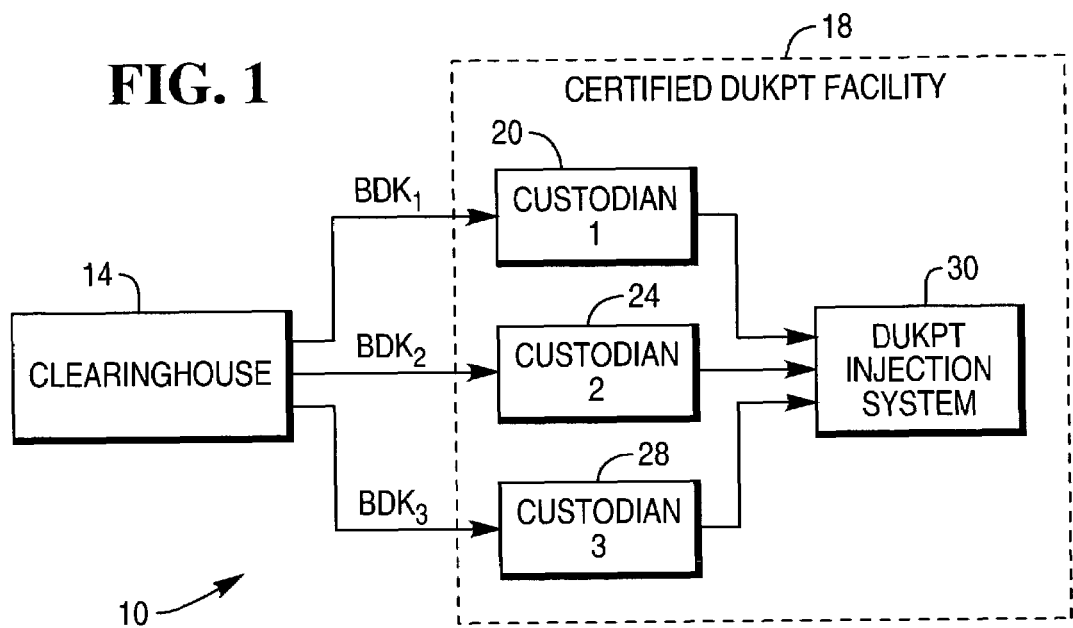
FIG. 1 depicts a typical provision of a BDK to a certified facility for the injection of DUKPT encryption devices.

An environment in which the system and method of the present invention may be used is shown in FIG. 1. Environment 10 includes a financial institution clearinghouse 14 and a certified DUKPT injection facility 18. Clearinghouse 14 generates Base Derivation Keys (BDKs) for use in injecting DUKPT encryption devices such as PIN pads for checkout stations and ATMs. Typically, clearinghouse 14 segments a BDK into multiple portions or segments for delivery to a facility 18. For example, a 128 bit BDK that may be generated for use in the injection of a DUKPT encryption device may be portioned into three segments for delivery to facility 18. As shown in FIG. 1, each BDK segment is delivered to a different custodian 20, 24, 28 at facility 18. A secure room is provided at facility 18 for housing a DUKPT injection system 30. Previously known DUKPT injection systems execute a BDK assembly program for generating the BDK at facility 18 so the BDK may be stored on the TRSM.

Each custodian 20, 24, 28 goes into the secure room alone and enters the BDK segment that was delivered to the custodian. In this manner, no custodian, alone or in the company of another custodian, has access to the entire BDK. After the last custodian leaves the secure room, the BDK assembly program of previously known DUKPT injection systems assembled the BDK segments into a single BDK. These previously known systems were then coupled to a Tamper Resistant Security Module (TRSM) so the assembled BDK may be downloaded to the TRSM for storage and later used for injection into DUKPT encryption devices at facility 18. The expense, tracking, storage, and maintenance of TRSM devices within facility 18 may be avoided by a system and method operating in accordance with the principles of the present invention.

Figure 2:
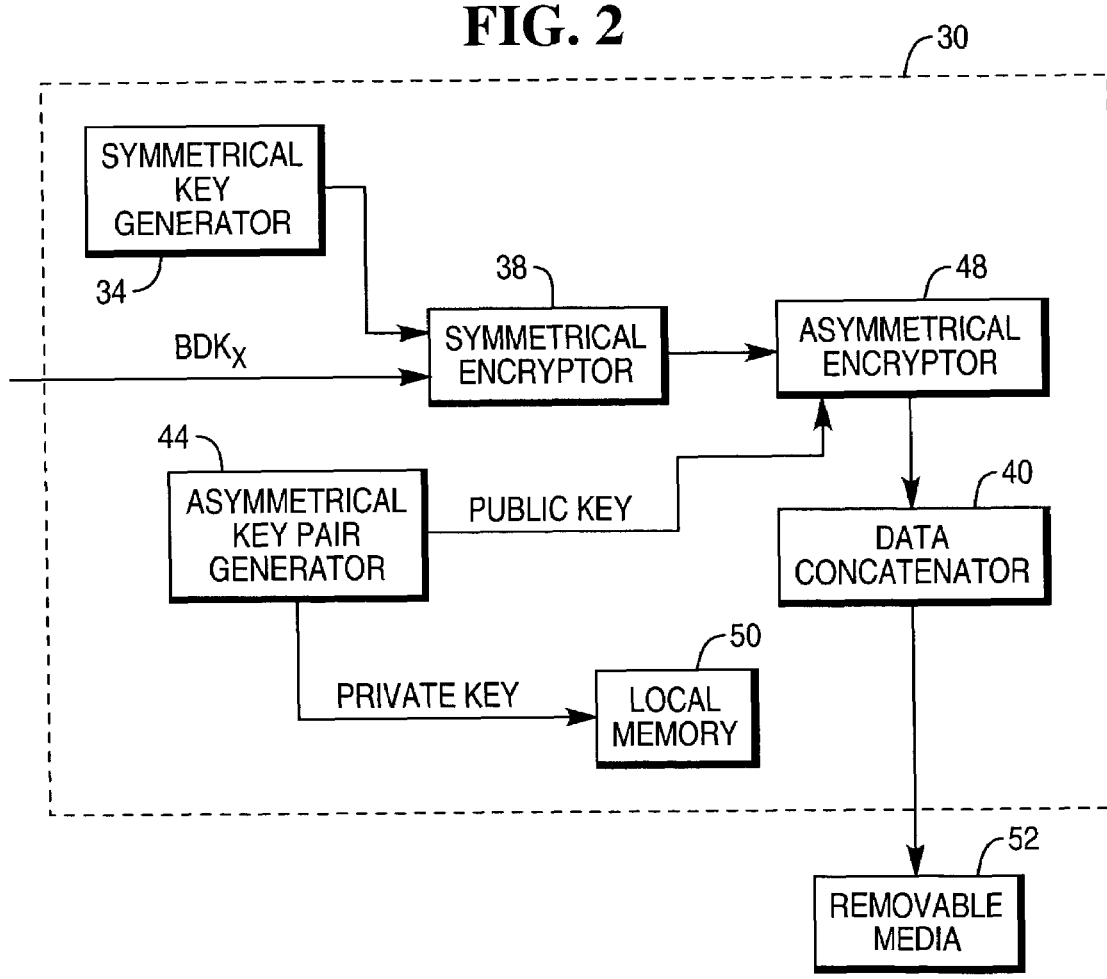
FIG. 2 is a block diagram of components for an exemplary DUKPT injection system that may be used for secure storage of a BDK at the certified facility of FIG. 1.

Components of an exemplary program executing in a DUKPT injection system 30 of the present invention that securely stores BDK segments are shown in FIG. 2. Symmetrical encryption device 38 is coupled to symmetrical key generator 34 and to the input device for injection system 30 to receive a BDK segment. Symmetrical key generator 34 performs any known algorithm for generating a key for symmetrical encryption. Preferably, this algorithm generates statistically random symmetrical keys. The symmetrical key is used by encryption device 38 to symmetrically encrypt a BDK segment. Preferably, the symmetrical encryption method is the triple Data Encryption Standard (DES) method although single DES or other symmetrical encryption methods may be used without deviating from the principles of the present invention.

Asymmetrical encryption device 48 may receive the symmetrically encrypted BDK segment and the symmetrical key from the symmetrical encryption device. Asymmetrical encryption device 48 also receives the public key of an asymmetrical key pair generated by asymmetrical key generator 44. Asymmetrical key generator 44 performs the asymmetrical key generation as defined by the utilized asymmetrical encryption algorithm. Asymmetrical encryption unit 48 uses the public key for asymmetrically encrypting the symmetrically encrypted BDK segment and the symmetrical key and the public key is then destroyed. Destruction may include writing a null or other random value into any variable that has been used with the public key. The private key, however, is stored in local memory 50. The private key may be encrypted before being stored. The asymmetrically encrypted BDK segment and the asymmetrically encrypted symmetrical key may be provided to a data concatenating device 40. Device 40 combines the encrypted BDK segment and the encrypted symmetrical key to form a data unit for storage. The asymmetrically encrypted BDK segment and the asymmetrically encrypted symmetrical key may be written to a removable media 52 such as a diskette, read/write CD, or other portable data storage unit. Media 52 may also be written with a media identification code so that injection system 30 may interrogate any media coupled to it for BDK regeneration to determine whether it wrote the encrypted data on media 52. Interrogation of a media identifier helps prevent attempted processing of data from an unknown data source.

Figure 3:
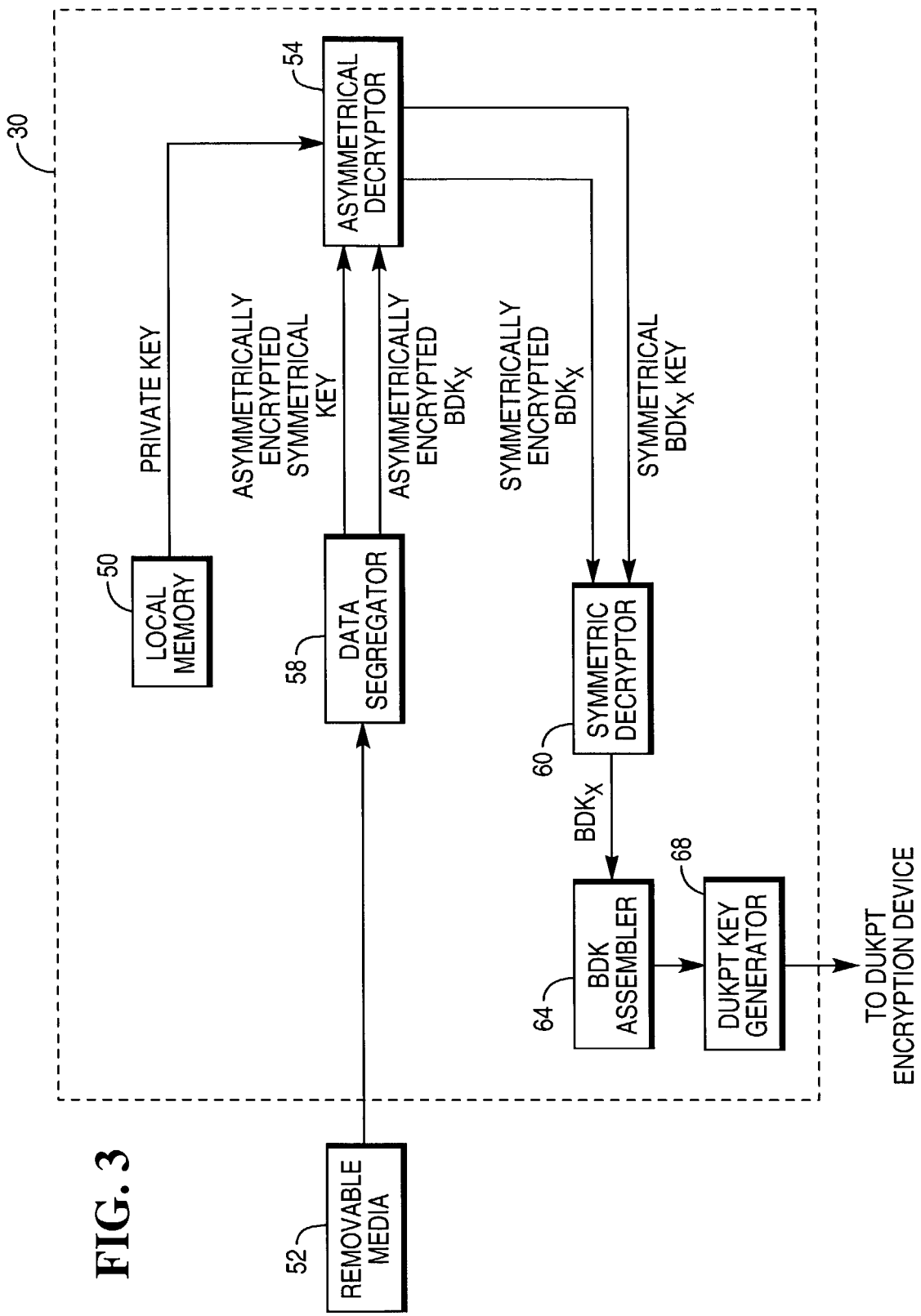
FIG. 3 is a block diagram of components for an exemplary DUKPT injection system that may be used for secure regeneration of a BDK at the certified facility of FIG. 1.

Components of an exemplary program executing in injection system 30 that may be used to regenerate a BDK from encrypted data stored on a removable media 52 are shown in FIG. 3. The removable media device 52 provides encrypted data to data segregator 58 for separation into an asymmetrically encrypted BDK segment that has been symmetrically encrypted and its asymmetrically encrypted symmetrical key. Asymmetrical decryption device 54 receives the asymmetrically encrypted BDK segment and the asymmetrically encrypted symmetrical key from data segregator 58. Asymmetrical decryption device 54 retrieves the private key from local memory 50 and decrypts the asymmetrically encrypted BDK segment and the asymmetrically encrypted symmetrical key. Device 54 provides the symmetrical key and the symmetrically encrypted BDK segment to symmetrical decryption device 60. Using the symmetrical key, symmetrical decryption device 60 performs the decrypting algorithm that decodes the symmetrically encrypted BDK segment. The decrypted BDK segment may be provided to BDK segment assembler device 64. Device 64 combines decrypted BDK segments to form the BDK by performing a logical operation. For example, each BDK segment may have a length that is equal to the length of the BDK. A logical XOR operation may be used to operate on such BDK segments to assemble a BDK. DUKPT key generator 68 may use the BDK to generate an IPPK or other key for injection into a DUKPT encryption device at facility 18.

The components shown in FIGS. 2 and 3 may be software programs or modules that perform the functions described above. The programs may be written in a known computer programming language for implementing encryption/decryption methods such as C or C++, although other computer programming languages may be used. In this manner, computer program modules are installed on injection system 30 for encrypting BDK segments and securing storing them on a removable media. Injection system 30 may read removable media 52 and the program modules may regenerate the BDK by using the locally stored private key with a asymmetrical decryption method and the symmetrical key with a symmetrical decryption method so the BDK may be used to inject DUKPT encryption devices. Alternatively, the components depicted in FIGS. 2 and 3 may be implemented in hardware installed in injection system 30 or they may be implemented in a combination of hardware and software. For example, a PC card having a dedicated processor with memory and I/O interface devices may be loaded with program components for performing the above-described functions and installed in injection system 30.

An exemplary method for securely storing an encrypted BDK with its symmetrical keys is shown in FIG. 4. A BDK segment is received (block 100) and a symmetrical key is generated (block 104). The symmetrical key is used to symmetrically encrypt the BDK segment (block 108). An asymmetrical private/public key pair is generated (block 110). The symmetrically encrypted BDK segment is asymmetrically encrypted using the public key (block 112). The symmetric key is asymmetrically encrypted using the public key (block 114) and the public key is destroyed (block 120). The private key from the generated private/public key pair is stored in local memory (block 124) and the encrypted BDK segment and the encrypted symmetrical key may be concatenated (block 126) before being written to a removable media (block 128). The method determines whether other BDK segments are required for the BDK (block 130) and if there are, the process encrypts the next BDK segment with its symmetrical key (blocks 100-128). Otherwise, a media identifier may be written to removable media 52 (block 134) and injection system 30 performs its other functions.

An exemplary method for regenerating a BDK from its encrypted BDK segments and their symmetrical keys is shown in FIG. 5. After verifying the removable media presented to injection system 30 was written by the injection system (block 150), if a media identifier was written to the media, an encrypted BDK segment and its encrypted key are read from the media as a unit or separately (block 154). The private key is retrieved from local memory (block 158). The encrypted BDK segment and key are segregated, if they were provided as a concatenated unit on the media, into an asymmetrically encrypted BDK segment and an asymmetrically encrypted symmetrical key (block 160). The asymmetrically encrypted BDK segment is decrypted using the retrieved private key (block 162). The asymmetrically encrypted symmetrical key is also decrypted using the retrieved private key (block 164). The symmetrically encrypted BDK segment is decrypted using the symmetrical key (block 168). If another BDK segment is to be decrypted (block 170), another encrypted BDK segment/key data structure is read from media 52 and processed (blocks 150-168). Once the requisite number of BDK segments have been decrypted, they are assembled to form the BDK (block 174) and the BDK may then be used (block 180) for the injection of DUKPT units at facility 18.

While the present invention has been illustrated by the description of exemplary processes and system components, and while the various processes and components have been described in considerable detail, applicant does not intend to restrict or in any limit the scope of the appended claims to such detail. For example, the system and method of the present invention have been generally illustrated in relation to a BDK segmented into three segments, but the principles of the invention may be applied to a BDK segmented into a greater or lesser number of segments. The principles of the present invention may be used to securely store a BDK that has not been segmented. Furthermore, the principles of the present invention may be applied to keys having a length other than the exemplary 128 bit length key discussed above. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A system for securing a Base Derivation Key (BDK) at a facility for injecting Derived Unique Key Per Transaction (DUKPT) encryption devices comprising:
    a symmetrical key generator that generates a symmetrical key for each BDK segment received for encryption;
    a symmetrical encryption device for encrypting a Base Derivation Key (BDK) segment using a symmetrical key received from the symmetrical key generator for the BDK segment encryption;
    an asymmetrical key pair generator for generating a private/public key pair for each BDK segment symmetrically encrypted;
    an asymmetrical encryption device that generates a doubly encrypted segment by encrypting the encrypted BDK segment using the public key of the private/public key pair that was generated for the BDK segment and that generates a singularly encrypted segment by encrypting the symmetrical key used to encrypt symmetrically the BDK segment, the asymmetrical encryption device destroying the public key of each private/public key pair used to encrypt an encrypted BDK segment and the corresponding symmetrical key used to encrypt the BDK segment after generation of the doubly encrypted segment and the singularly encrypted symmetrical key; and
    a local memory for storing the private keys of each private/public key pair used to encrypt BDK segments and symmetrical keys.

2. The system of claim 1 wherein the asymmetrical encryption device writes each doubly encrypted BDK segment and the corresponding singularly encrypted symmetrical key to an independent removable media for transportation to a DUKPT injection facility.

3. The system of claim 1 wherein the symmetrical encryption device performs a Data Encryption Standard (DES) encryption method.

4. The system of claim 1 wherein the symmetrical encryption device performs a triple DES encryption method.

5. The system of claim 2 further comprising:
    a device for concatenating each doubly encrypted BDK segment and the corresponding singularly encrypted symmetrical key to form a single data structure for storage on a removable media.

6. A system for preparing an encrypted Base Derivation Key (BDK) for use in injecting a Derived Unique Key Per Transaction (DUKPT) encryption device comprising:
    an asymmetrical decryption device using a private key of a private/public key pair to decrypt asymmetrically a doubly encrypted Base Derivation Key (BDK) segment to generate a symmetrically encrypted BDK segment and to decrypt asymmetrically a singularly encrypted symmetrical key to generate the symmetrical key;
    a symmetrical decryption device for decrypting the symmetrically encrypted BDK segment using the symmetrical key generated by asymmetrically decrypting the singularly encrypted symmetrical key; and
    a BDK assembler for assembling a plurality of decrypted BDK segments, each one of which was decrypted with a different symmetrical key, the assembled BDK segments forming a single BDK for use in the injection of a Derived Unique Key Per Transaction (DUKPT) encryption device.

7. The system of claim 6 wherein the asymmetrical decryption device receives each doubly encrypted BDK segment and the corresponding singularly encrypted symmetrical key from different removable media.

8. The system of claim 6 wherein the symmetrical decryption device performs a Data Encryption Standard (DES) decryption method.

9. The system of claim 6 wherein the symmetrical decryption device performs a triple DES decryption method.

10. The system of claim 6 further comprising:
    a device for segregating the doubly encrypted BDK segment from the singularly encrypted symmetrical key that was used to encrypt the BDK segment.

11. A method for securing a Base Derivation Key (BDK) at a facility for injecting Derived Unique Key Per Transaction (DUKPT) encryption devices comprising:
    encrypting a first Base Derivation Key (BDK) segment using a first symmetrical key;
    encrypting a second Base Derivation Key (BDK) segment using a second symmetrical key, the second symmetrical key being different than the first symmetrical key;
    generating a first asymmetrical key pair;
    generating a second asymmetrical key pair, the second asymmetrical key pair being different than the first asymmetrical key pair;
    generating a first doubly encrypted BDK segment by encrypting the first symmetrically encrypted BDK segment using a public key of the first asymmetrical key pair;
    generating a second doubly encrypted BDK segment by encrypting the second symmetrically encrypted BDK segment using a public key of the second asymmetrical key pair;

encrypting the first symmetrical key used to encrypt the first BDK segment using the public key of the first asymmetrical key pair;

encrypting the second symmetrical key used to encrypt the second BDK segment using the public key of the second asymmetrical key pair;

destroying the public key of the first asymmetrical key pair after the asymmetrical encryption of the first symmetrically encrypted BDK segment and the asymmetrical encryption of the first symmetrical key;

destroying the public key of the second asymmetrical key pair after the asymmetrical encryption of the second symmetrically encrypted BDK segment and the asymmetrical encryption of the second symmetrical key; and storing the first private key and the second private key in a local storage device.

12. The method of claim 11 further comprising:

writing the first doubly encrypted BDK segment and the first singularly encrypted symmetrical key to a first removable media;

writing the second doubly encrypted BDK segment and the second singularly encrypted symmetrical key to a second removable media.

13. The method of claim 11 wherein the symmetrical encryption comprises performing a Data Encryption Standard (DES) encryption method.

14. The method of claim 11 wherein the symmetrical encryption comprises performing a triple DES encryption method.

15. The method of claim 12 further comprising:

concatenating the first doubly encrypted BDK segment and the singularly encrypted symmetrical key to form a first single data structure that is written to the first removable media; and concatenating the second doubly encrypted BDK segment and the singularly encrypted symmetrical key to form a second single data structure that is written to the second removable media.

16. A method for preparing an encrypted Base Derivation Key (BDK) for use in generating an Initial PIN Pad Key for injection into a Derived Unique Key Per Transaction (DUKPT) encryption device comprising:

asymmetrically decrypting with a private key of a first private/public key pair a first doubly encrypted Base Derivation Key (BDK) segment to generate a first symmetrically encrypted BDK segment;

asymmetrically decrypting with the private key of the first private/public key pair a first singularly encrypted symmetrical key to generate a first symmetrical key;

symmetrically decrypting the first symmetrically encrypted BDK segment using the first symmetrical key generated from the asymmetrical decryption of the first singularly encrypted symmetrical key to generate a first decrypted BDK segment;

asymmetrically decrypting with a private key of a second private/public key pair a second doubly encrypted Base Derivation Key (BDK) segment to generate a second symmetrically encrypted BDK segment;

asymmetrically decrypting with the private key of the second private/public key pair a second singularly encrypted symmetrical key to generate a second symmetrical key;

symmetrically decrypting the second symmetrically encrypted BDK segment using the second symmetrical key generated from the asymmetrical decryption of the second singularly encrypted symmetrical key to generate a second decrypted BDK segment; and assembling the first and the second decrypted BDK segments to form a BDK for use in the injection of a Derived Unique Key Per Transaction (DUKPT) encryption device.

17. The method of claim 16 further comprising:

receiving the first doubly encrypted BDK segment and the first singularly encrypted symmetrical key from a first removable media on which both the first doubly encrypted BDK segment and the first singularly encrypted symmetrical key are stored; and receiving the second doubly encrypted BDK segment and the second singularly encrypted symmetrical key from a second removable media on which both the second doubly encrypted BDK segment and the second singularly encrypted symmetrical key are stored.

18. The method of claim 16 wherein the symmetrical decryption comprises performing a Data Encryption Standard (DES) decryption method.

19. The method of claim 16 wherein the symmetrical decryption comprises performing a triple DES decryption method.

20. The method of claim 16 further comprising:

segregating the first doubly encrypted BDK segment from the first singularly encrypted symmetrical key; and segregating the second doubly encrypted BDK segment from the second singularly encrypted symmetrical key.

* * * * *